US006837113B1

(12) United States Patent
Freund, Jr. et al.

(10) Patent No.: US 6,837,113 B1
(45) Date of Patent: Jan. 4, 2005

(54) ENHANCED VELOCITY ESTIMATION IN ULTRASONIC FLOW METERS

(75) Inventors: William R. Freund, Jr., Houston, TX (US); Gail P. Murray, Houston, TX (US); Abhishek Bhatt, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 10/656,571

(22) Filed: Sep. 5, 2003

(51) Int. Cl.[7] ................................................. G01F 1/20
(52) U.S. Cl. ................................................... 73/861.18
(58) Field of Search ............. 73/861.18, 861.25–861.31

(56) References Cited

U.S. PATENT DOCUMENTS

| | | | | |
|---|---|---|---|---|
| 4,317,178 A | * | 2/1982 | Head ............................ 702/47 |
| 4,596,133 A | * | 6/1986 | Smalling et al. ............ 73/24.01 |
| 6,067,861 A | * | 5/2000 | Shekarriz et al. ......... 73/861.25 |
| 6,128,072 A | | 10/2000 | Kiel et al. ...................... 356/28 |
| 6,209,388 B1 | * | 4/2001 | Letton et al. ............... 73/61.79 |
| 6,275,284 B1 | | 8/2001 | Kiel et al. ...................... 356/28 |
| 6,386,018 B1 | * | 5/2002 | Letton et al. ............... 73/61.79 |
| 6,494,105 B1 | * | 12/2002 | Gallagher ................. 73/861.27 |
| 6,550,345 B1 | * | 4/2003 | Letton ...................... 73/861.27 |
| 6,732,595 B2 | * | 5/2004 | Lynnworth ............... 73/861.25 |

* cited by examiner

*Primary Examiner*—Edward Lefkowitz
*Assistant Examiner*—Corey D. Mack
(74) *Attorney, Agent, or Firm*—Conley Rose, P.C.

(57) ABSTRACT

Methods and apparatus for operating an ultrasonic flow meter to accurately estimate the average flow velocity in a pipe when the meter has at least one failed chord and one non-failed chord. The method partitions the velocity range into a number of consecutive, non-overlapping "bins," where separate bins are maintained for each chord and each flow direction. Each bin stores a chord proportion value and, in some embodiments, a chord velocity value. The bins are initialized with pre-selected values and, during normal operation, updated, or trained, based on the measured velocities. When a chord fails, and there is at least one non-failed chord, an estimated proportion value for each non-failed chord is generated using the values stored in the bins. The estimated average flow velocity is then calculated by dividing the summation of the measured flow velocities, from the non-failed chords, by the summation of the estimated proportions.

24 Claims, 4 Drawing Sheets

ENHANCED VELOCITY ESTIMATION IN ULTRASONIC FLOW METERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

A disclosed embodiment of the invention relates generally to the measurement of fluids flowing through an ultrasonic meter.

After a hydrocarbon such as natural gas has been removed from the ground, the gas stream is commonly transported from place to place via pipelines. As is appreciated by those of skill in the art, it is desirable to know with accuracy the amount of gas in the gas stream. Particular accuracy for gas flow measurements is demanded when gas (and any accompanying liquid) is changing hands, or "custody." Even where custody transfer is not taking place, however, measurement accuracy is desirable.

Gas flow meters have been developed to determine how much gas is flowing through the pipeline. An orifice meter is one established meter to measure the amount of gas flow. More recently, another type of meter to measure gas was developed. This more recently developed meter is called an ultrasonic flow meter.

Figure 1A:
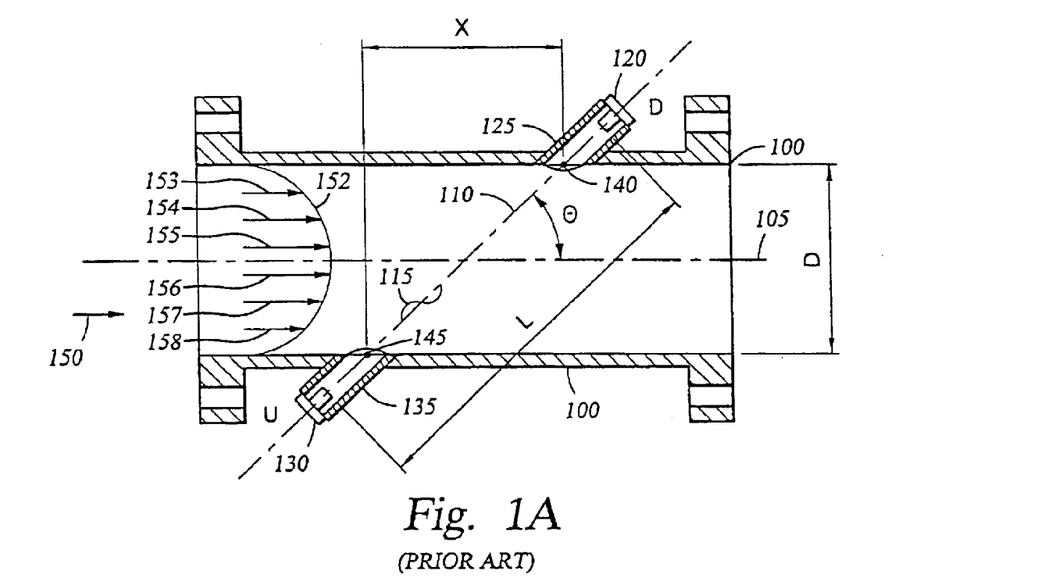
FIG. 1A is a schematic of an ultrasonic meter suitable for measuring gas flow.

FIG. 1A shows an ultrasonic meter suitable for measuring gas flow. Spoolpiece 100, suitable for placement between sections of gas pipeline, has a predetermined size and thus defines a measurement section. Alternately, a meter may be designed to attach to a pipeline section by, for example, hot tapping. As used herein, the term "pipeline" when used in reference to an ultrasonic meter may be referring also to the spoolpiece or other appropriate housing across which ultrasonic signals are being sent. A pair of transducers 120 and 130, and their respective housings 125 and 135, are located along the length of spoolpiece 100. A path 110, sometimes referred to as a "chord" exists between transducers 120 and 130 at an angle θ to a centerline 105. The position of transducers 120 and 130 may be defined by this angle, or may be defined by a first length L measured between transducers 120 and 130, a second length X corresponding to the axial distance between points 140 and 145, and a third length D corresponding to the pipe diameter. Distances D, X and L are precisely determined during meter fabrication. Points 140 and 145 define the locations where acoustic signals generated by transducers 120 and 130 enter and leave gas flowing through the spoolpiece 100 (i.e. the entrance to the spoolpiece bore). In some instances, meter transducers such as 120 and 130 are placed a distance from points 140 and 145, respectively, regardless of meter size (i.e. spoolpiece size). A fluid, typically natural gas, flows in a direction 150 with a velocity profile 152. Velocity vectors 153–158 indicate that the gas velocity through spool piece 100 increases as centerline 105 of spoolpiece 100 is approached.

Transducers 120 and 130 are ultrasonic transceivers, meaning that they both generate and receive ultrasonic signals. "Ultrasonic" in this context refers to frequencies above about 20 kilohertz. Typically, these signals are generated and received by a piezoelectric element in each transducer. To generate an ultrasonic signal, the piezoelectric element is stimulated electrically, and it responds by vibrating. This vibration of the piezoelectric element generates an ultrasonic signal that travels across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter.

Initially, D ("downstream") transducer 120 generates an ultrasonic signal that is then received at, and detected by, U ("upstream") transducer 130. Some time later, U transducer 130 generates a return ultrasonic signal that is subsequently received at and detected by D transducer 120. Thus, U and D transducers 130 and 120 play "pitch and catch" with ultrasonic signals 115 along chordal path 110. During operation, this sequence may occur thousands of times per minute.

The transit time of the ultrasonic wave 115 between transducers U 130 and D 120 depends in part upon whether the ultrasonic signal 115 is traveling upstream or downstream with respect to the flowing gas. The transit time for an ultrasonic signal traveling downstream (i.e. in the same direction as the flow) is less than its transit time when traveling upstream (i.e. against the flow). In particular, the transit time $t_1$, of an ultrasonic signal traveling against the fluid flow and the transit time $t_2$ of an ultrasonic signal travelling with the fluid flow may be defined:

$$t_1 = \frac{L}{c - V\frac{x}{L}} \qquad (1)$$

$$t_2 = \frac{L}{c + V\frac{x}{L}} \qquad (2)$$

where, c=speed of sound in the fluid flow;

V=average axial velocity of the fluid flow over the chordal path in the axial direction;

L=acoustic path length;

x=axial component of L within the meter bore;

$t_1$=transmit time of the ultrasonic signal against the fluid flow; and $t_2$=transit time of the ultrasonic signal with the fluid flow.

The upstream and downstream transit times can be used to calculate the average velocity along the signal path by the equation:

$$V = \frac{L^2}{2x} \frac{t_1 - t_2}{t_1 t_2} \qquad (3)$$

with the variables being defined as above.

The upstream and downstream travel times may also be used to calculate the speed of sound in the fluid flow according to the equation:

$$c = \frac{L}{2} \frac{t_1 + t_2}{t_1 t_2} \qquad (4)$$

To a close approximation, equation (3) may be restated as:

$$V = \frac{c^2 \Delta t}{2x} \quad (5)$$

where, $$\Delta t = t_1 - t_2 \quad (6)$$

So to a close approximation at low velocities, the velocity V is directly proportional to Δt.

Given the cross-section measurements of the meter carrying the gas, the average velocity over the area of the meter bore may be used to find the volume of gas flowing through the meter or pipeline 100.

In addition, ultrasonic gas flow meters can have one or more paths. Single-path meters typically include a pair of transducers that projects ultrasonic waves over a single path across the axis (i.e. center) of spoolpiece 100. In addition to the advantages provided by single-path ultrasonic meters, ultrasonic meters having more than one path have other advantages. These advantages make multi-path ultrasonic meters desirable for custody transfer applications where accuracy and reliability are crucial.

Figures 1B, 1C:
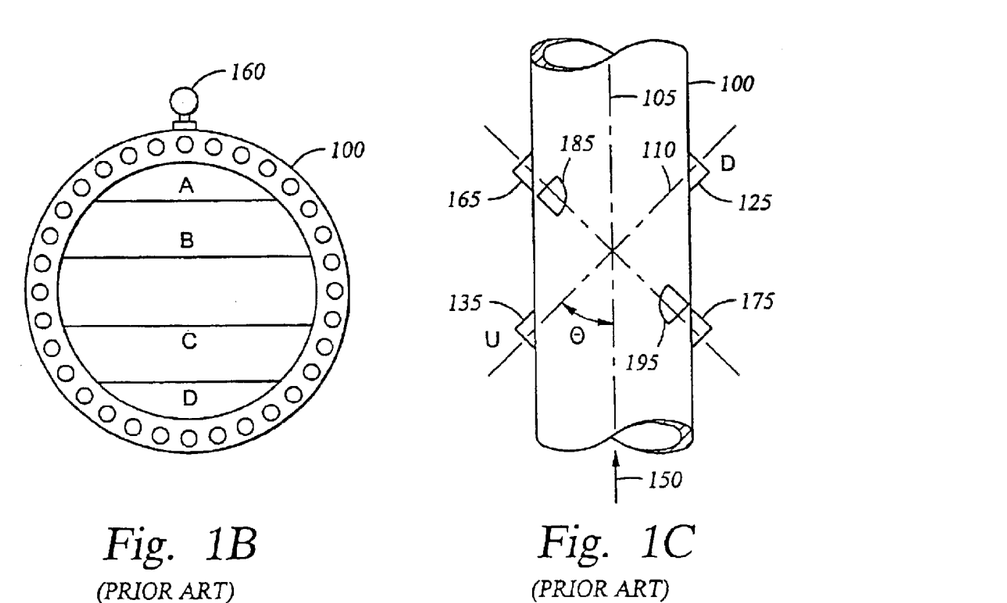
FIG. 1B is a schematic of a multi-path ultrasonic meter for measuring gas flow.
FIG. 1C is a schematic of a multi-path ultrasonic meter that illustrates the arrangement of four pairs of transducers.

Referring now to FIG. 1B, a multi-path ultrasonic meter is shown. Spool piece 100 includes four chordal paths A, B, C, and D at varying levels through the gas flow. Each chordal path A–D corresponds to two transceivers behaving alternately as a transmitter and receiver. Also shown is an electronics module 160, which acquires and processes the data from the four chordal paths A–D. This arrangement is described in U.S. Pat. No. 4,646,575, the teachings of which are hereby incorporated by reference. Hidden from view in FIG. 1B are the four pairs of transducers that correspond to chordal paths A–D.

The precise arrangement of the four pairs of transducers may be more easily understood by reference to FIG. 1C. Four pairs of transducer ports are mounted on spool piece 100. Each of these pairs of transducer ports corresponds to a single chordal path of FIG. 1B. A first pair of transducer ports 125 and 135 includes transducers 120 and 130 recessed slightly from the spool piece 100. The transducers are mounted at a non-perpendicular angle θ to centerline 105 of spool piece 100. Another pair of transducer ports 165 and 175 including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X and the lower two pairs of transducers corresponding to chords C and D also form an X.

Referring now to FIG. 1B, the flow velocity of the gas may be determined at each chord A–D to obtain chordal flow velocities. To obtain an average flow velocity over the entire pipe, the chordal flow velocities are multiplied by a set of predetermined constants. Such constants are based on the geometry of the meter, were determined theoretically, and are well known.

As described above, the flow velocity of a gas may be determined at each chord A–D to obtain chordal flow velocities. However, chord failure may occur. As a result, a substitution algorithm that estimates flow profiles is often used to estimate the velocity for failed chords when at least one chord is not failed.

In the substitution algorithm, estimated flow profiles are represented by a proportion value for each chord. In the event of a chord failure, the failed chord velocity is estimated using the failed chord's proportion and the non-failed chord(s) velocity and proportion. After the failed chord velocity is estimated, the average flow velocity over the entire pipe is obtained by using the non-failed chords measured velocities and failed chords' estimated velocities.

While the substitution algorithm aims to provide an accurate average flow velocity for the pipe, using estimated values for failed chords may deteriorate the accuracy of the average flow velocity. For example, the substitution algorithm fails to take meter non-linearity into consideration; it assumes the set of proportions is valid over the entire velocity range. Therefore, failed chords are afforded a proportion value that is equal to the last calculated proportion value for that chord, regardless of the fact that the proportion value may have changed.

Thus, there is a need for a method that is capable of more accurately estimating the average flow velocity in a pipe.

SUMMARY OF THE PREFERRED EMBODIMENTS

The present invention relates to a method for operating an ultrasonic flow meter that accurately estimates the average flow velocity in a pipe when the meter has at least one failed chord and at least one non-failed chord. In a preferred embodiment, the present method partitions the velocity range into a number of consecutive, non-overlapping "bins," where separate bins are maintained for each chord and each direction. Each velocity bin stores at least a chord proportion value and, in some embodiments, a chord velocity value. The bins are initialized with preselected proportion and velocity values, where appropriate. Once the meter is operating acceptably, the proportion and velocity values within the bins are updated, or trained, based on the velocities measured by the meter and determined proportions. This updating continues as long as the meter is fully operational. When a chord fails, and there is at least one non-failed chord, the method generates an estimated proportion value for each measured velocity from the non-failed chords. The estimated average flow velocity is then calculated by dividing the summation of the measured flow velocities, from the non-failed chords, by the summation of the estimated proportions generated by the method.

In one embodiment, an estimated proportion for a measured velocity is generated by interpolating between the values recorded in two trained bins, if the measured velocity is between the velocity values stored in the two trained bins. As alternatives to linear interpolation, other curve fit methods, such as linear regression, polynomial fit, weighted polynomial fit, and cubic spline, may be used. If the measured velocity is less than the lowest velocity value in a trained bin, the estimated proportion will be equal to the proportion value from the trained bin with the lowest velocity value. If the measured velocity is more than the highest velocity value in a trained bin, the estimated proportion will be equal to the proportion value from the trained bin with the highest velocity value.

In an alternate embodiment, an estimated proportion for a measured velocity is generated by using the stored proportion value for the bin containing the measured velocity. If the appropriate bin is untrained, the proportion used could be the default value, the proportion value from the bin closest to the velocity, the nearest trained value from a bin below the velocity, the nearest trained value from a bin above the velocity, or an average of the nearest trained values on either side of the velocity.

Thus, the present invention comprises a combination of features and advantages, which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

As discussed above, in the prior substitution algorithm, estimated flow profiles are represented by a proportion value for each chord. In the event of a chord failure, the failed chord velocity is estimated using the failed chord's proportion ($Prop_{fc}$) and the non-failed chord(s) velocity ($V_{nf}$) and proportion ($Prop_{nf}$). After the failed chord velocity is estimated, the average flow velocity over the entire pipe is obtained by using the non-failed and failed chords' velocities.

In the prior substitution algorithm, failed chord velocity ($V_{fc}$) is determined according to the following equation:

$$V_{fc} = Prop_{fc} \times \frac{\sum_{\substack{Non-Failed \\ Chords}} V_{nf}}{\sum_{\substack{Non-Failed \\ Chords}} Prop_{nf}} \quad (7)$$

The average flow velocity ($V_{wtdavg}$) is then estimated according to the standard equation:

$$V_{wtdavg} = \sum_{\substack{Active \\ Chords}} Wt_{chord} V_{chord} \quad (8)$$

where $Wt_{chord}$ = geometry-based weight for a paticular chord $V_{chord}$ = measured velocity for non-failed chord or the estimated velocity for failed chord $V_{fc}$ Referring to Equation 7, the failed chords are afforded a proportion value that is equal to the last calculated proportion value for that chord, regardless of the fact that the proportion value may have changed. Therefore, when the average flow velocity is calculated in Equation 8 using active chords (i.e. non-failed chord measured velocities and failed chord estimated velocities), it may be less than completely accurate.

In contrast, the method of the present invention accurately estimates the average flow velocity in a pipe when a chord has failed by providing a velocity-dependent proportion(s) and using the measured velocity and velocity-dependent proportion(s) from a non-failed chord(s) to determine the average flow velocity in the pipe.

In the preferred embodiments, for each chord and each direction, the present method partitions the maximum velocity range into a number of consecutive, non-overlapping "bins"; a bin being herein defined as a range of possible velocities. For each of these velocity bins, the method maintains at least a chord proportion value and in certain embodiments, may also maintain a chord velocity value corresponding to the proportion value. The proportion value for each chord is determined by dividing the velocity measured for the particular chord by the average flow velocity, as shown in Equation 9:

$$Prop_{chord} = \frac{V_{chord}}{V_{wtdavg}}; \text{ where} \quad (9)$$

$Prop_{chord}$ = current proportion for a chord $V_{chord}$ = measured velocity for a chord $V_{wtdavg}$ = average flow velocity.

Figure 2:
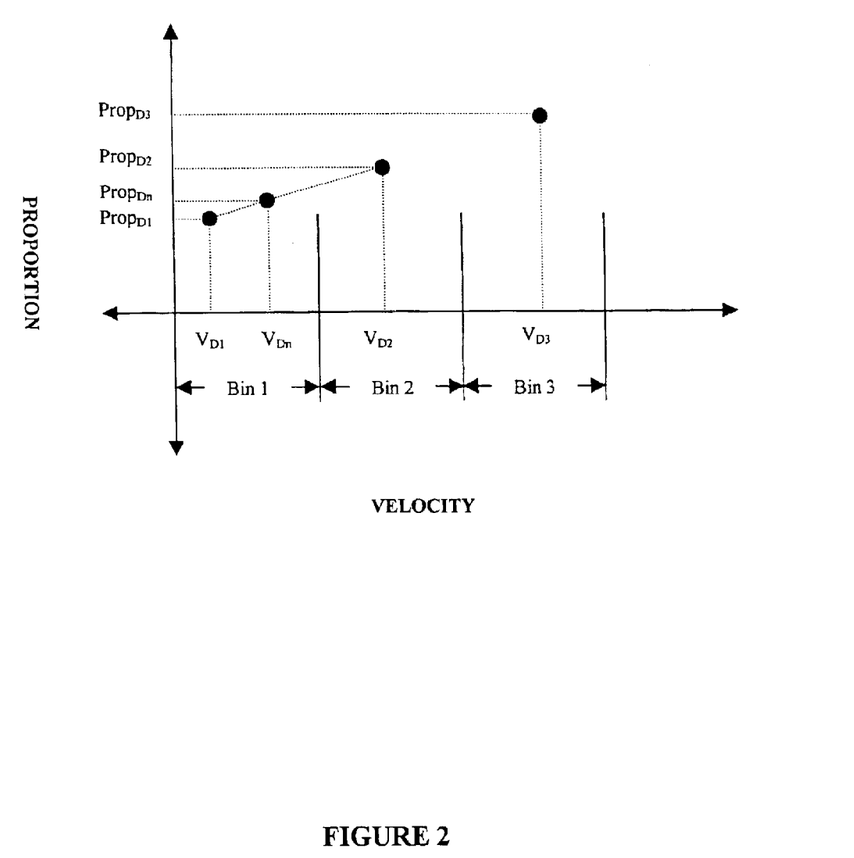
FIG. 2 is a corrologram showing the determination of an estimated proportion value in a first case using linear interpolation.
Figure 3:
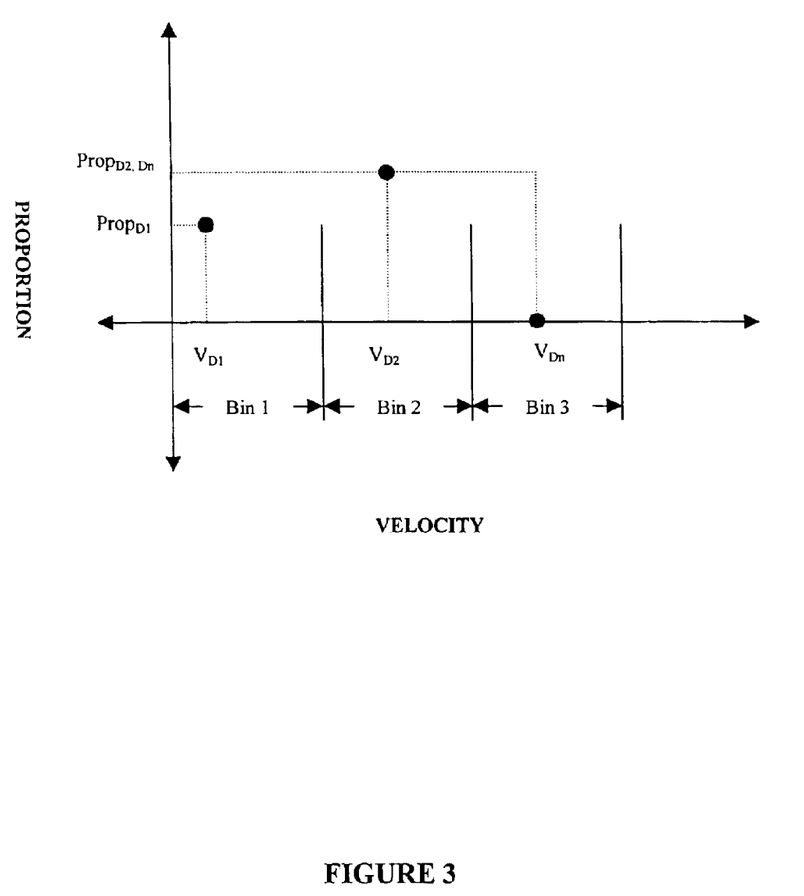
FIG. 3 is a corrologram showing the determination of an estimated proportion value in a second case using value substitution.

Referring to FIGS. 2 and 3, corrolograms are shown that illustrate the relationship between velocity bins and proportions. In a preferred embodiment, each chord has ten velocity bins in each direction.

When all of the chords are working properly (i.e. there are no failed chords), the present method uses measured velocity values and the geometry-based weight factors as shown in Equation 8 to calculate the average flow velocity through a pipe. As an alternative to the weighted average calculation shown in Equation 8, the average flow velocity may also be calculated using a straight average, a Reynold's number corrected average, or other processes as may be available.

As additional measurements are taken, the velocity and proportion values stored in the appropriate bins are updated. When a chord fails, the updated values are used to generate estimated proportion values for each non-failed chord. The estimated flow velocity is then calculated by dividing the summation of the measured velocities of the non-failed chords by the summation of the estimated proportions. The methodology 200 of the preferred embodiments is more clearly seen in FIG. 4.

Figure 4:
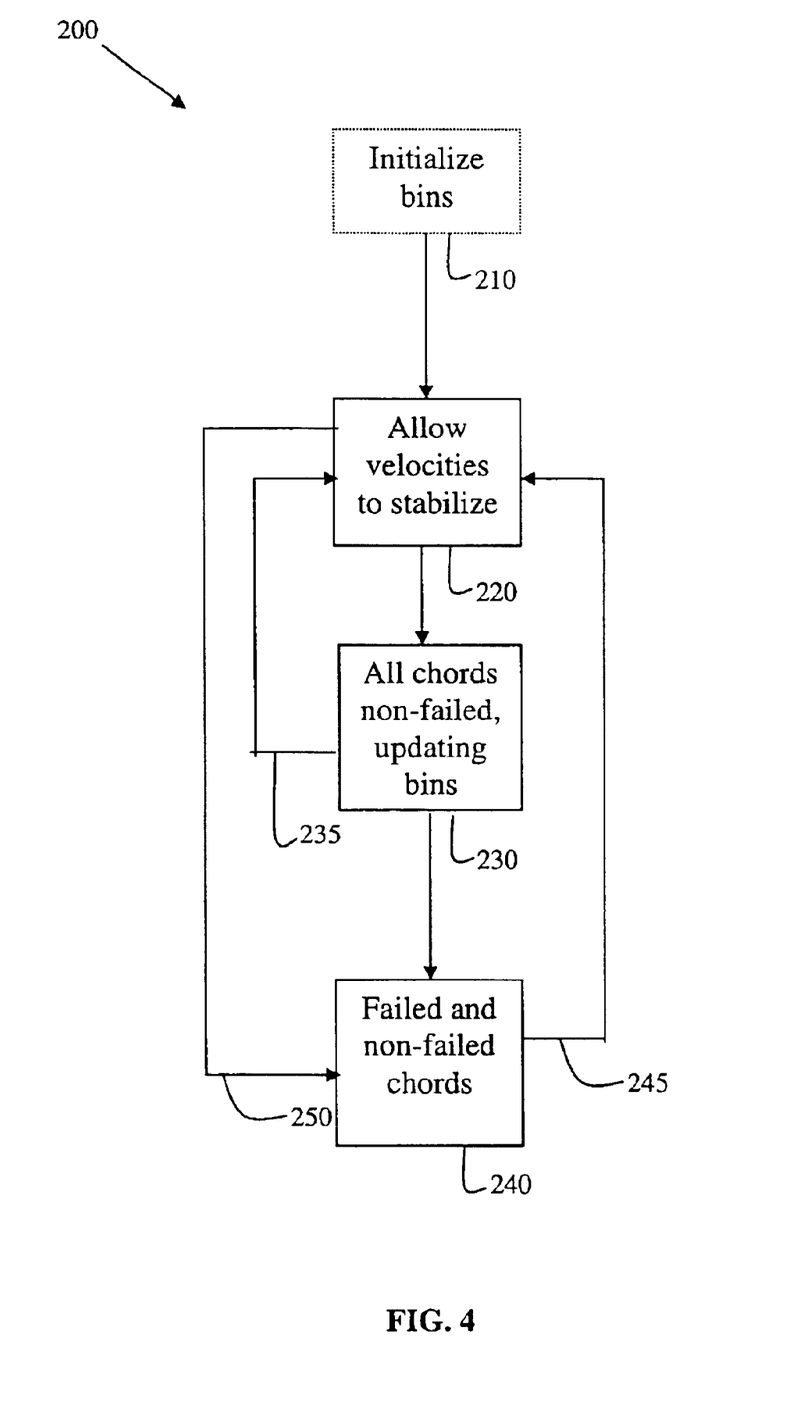
FIG. 4 is a block diagram of one method for operating a meter in accordance with the principles of the present invention.

In FIG. 4, in a first state 210 a plurality of bins are initialized with default values, each default value having a velocity value and a proportion value. The proportion values are preferably initialized to meter-geometry-dependent default values and the chord velocity values are initialized to a value within the bin's velocity range. In a preferred embodiment, the chord velocities are initialized to the bin median velocity.

In a second state 220, the measurement stability is determined by requiring a predetermined number of consecutive velocity measurements on all chords. The predetermined number may be as low as one, depending on user preferences. In certain embodiments, the measurement stability verification performed in second state 220 may be eliminated.

In a third state 230, where all of the chords are working properly, the measured velocity from each chord is used to calculate an average flow velocity according to Equation 8, where the active chords are non-failed chord measured velocities.

Once a proportion value has been determined for a particular velocity value for a chord, the bin corresponding to that velocity value is updated using the current measured velocity and determined proportion value. Once a bin has been updated, it is considered trained. In certain embodiments, each bin may also store a flag value indicating if the bin has been trained. In the preferred embodiments, a bin's chord velocity and proportion values are updated as a function of the previous velocity and proportion values and the current velocity and proportion values. This updating function may be the simplest technique of using the last calculated value, to one using a moving or running average of the values, to one of filtering the values with some low pass filter. For example a filter of the following form may be used.

$$PropUpdateValue_{chord} = \frac{(n-1)PrevPropUpdateValue_{chord} + Prop_{chord}}{n}; \quad (10)$$

where $PropUpdateValue_{chord}$=the new updated proportion value for a chord to be stored $PrevPropUpdateValue_{chord}$=the previous stored proportion value for a chord $Prop_{chord}$=the current calculated proportion value for a chord n=a number greater than 1 which controls the response time of the filter, as n increases the response time increases, a typical value for n is 10.

These updated values are then preferably stored in non-volatile memory.

In a fourth state 240, some of the chords are not working properly (i.e. there is at least one failed chord and one non-failed chord), the present method uses measured velocity values and estimated proportion values to calculate the estimated average flow velocity through the meter. The flow velocity from each of the non-failed chords is measured and an estimated proportion value for each of the measured flow velocities is then determined using the values maintained in the velocity bins (e.g. the most recently updated proportion values). The estimated proportion values can be determined using a variety of methods, which will be discussed in detail below.

The estimated velocity ($V_{est\ avg}$) is then calculated by dividing the summation of the measured flow velocities ($V_{chord}$) by the summation of the estimated proportions ($Prop_{chord}$), as shown in Equation 11:

$$V_{est\ avg} = \frac{\sum_{\substack{Non-Failed \\ Chords}} V_{chord}}{\sum_{\substack{Non-Failed \\ Chords}} Prop_{chord}} \quad (11)$$

As long as there is at least one failed chord and one non-failed chord, the measured velocity value and estimated proportion value from each non-failed chord are used to calculate the estimated average flow velocity according to Equation 11.

There are some situations that do not fall into either of the above-described cases. For example, the system may be operating in the third state 230, where all of the chords are working properly and the velocity and proportion values are continuously updated. Then, for whatever reason, all the chords may fail. In this situation, the method bypasses the fourth state 240 and returns to the second state 220 (as indicated by arrow 235) to confirm a stable system.

In another situation, once the system is stabilized, a chord may fail before the system shifts to the third state 230 and any bins are updated (trained), the method shifts to the fourth state 240 (as indicated by arrow 250) and the initialized values are used to estimate flow velocities.

Another situation that may occur is when the system is operating in the fourth state 240 and all of the previously failed chords come back online (i.e. are now non-failed). If all the chords are now working properly, the method ceases estimating the flow velocity per Equation 11, and returns to the second state 220 (as indicated by arrow 235) to confirm a stable system.

The proportion values for the non-failed chords that are used in Equation 11 to calculate the estimated velocity of the flow can be generated from the stored proportion values in a variety of methods. The method chosen for a particular application may depend on the accuracy desired, the computing power available, or the desired complexity of the method. It is understood that the proportion estimation methods described herein are not exclusive and, except where expressly claimed, do not limit the scope of the invention to the described methods. It is understood that other proportion estimation processes, or derivations or combinations of those described herein, can be used without departing from the scope of the current invention.

One of the simplest embodiments of a proportion estimation method is to simply use the proportion value stored in the appropriate bin for a given measured non-failed chord velocity. Not only does this method reduce computational demands on the system, it only uses the stored proportion value for each bin. Thus, the need to maintain a corresponding velocity value is eliminated and the memory storage requirements are reduced. In this embodiment, when one chord fails, the proportion in the appropriate bin of each non-failed chord is used.

As the velocity of a non-failed chord is determined, the system looks to the bin for the range of velocities that includes the measured velocity and uses the proportion value found in this bin. In order to improve performance, the method preferably accounts for exceptions in the case of a non-trained bin. In various situations, the method could account for a non-trained bin by using the default proportion value, the proportion value from the bin closest to the velocity, the proportion value from the nearest trained value above or below the velocity, or, in a simple calculation, use an average of the nearest trained proportion values on either side of the velocity.

In some embodiments, rather than estimating the proportion value for each of the measured velocity values by using the values maintained in the velocity bins, the proportion value can be estimated using linear interpolation. For example, when a measured flow velocity is between the velocity values of two trained bins, the estimated proportion for the measured flow velocity may be determined by interpolating between the two bins. In this embodiment, the system stores the chord velocity along with the proportion value. This allows the determination of a proportion for the non-failed chords using linear interpolation between two data pair. The interpolation methods could account for non-trained bins by simply interpolating between trained bins on either side of the measured velocity value. As an alternative to linear interpolation other curve fit methods, such as linear regression, polynomial fit, weighted polynomial fit, cubic spline, etc. could also be used to generate estimated proportion values.

In certain embodiments, another exception may exist for how to handle the two ends of the measurement scale. One method is to let the lowest bin include values for zero flow and let the highest bin include values for all velocities above some set velocity. Another method would be to use the lowest trained value for low velocities and the highest trained value for velocities above those covered by the bins.

For example, if a measured flow velocity is greater than the highest velocity value covered by the bins, the estimated proportion for the measured flow velocity can be assigned the proportion value for the trained bin with the highest velocity value. Alternately, if a measured flow velocity is less than the lowest velocity value covered by the bins, the estimated proportion for the measured flow velocity can be assigned the proportion value for the trained bin with the lowest velocity value.

Benefits realized by the present method include (1) the average flow velocity is determined only using non-failed chords and (2) the stored proportion values may be used to estimate a working chord's proportion value based upon the chord's velocity value, thus providing a more accurate determination of flow velocity when a chord has failed as compared to systems using a single set of proportions for all velocities. It is understood that the performance of the present system can be maximized by increasing the number of velocity bins for a given velocity range and increasing the accuracy of the proportion estimation method. These advancements come at the cost of computation complexity and storage requirements so not all applications demand the highest level of accuracy. Therefore, less complex versions of the current system may be used in those applications where permitted.

A variety of different cases that may occur using select embodiments of the present invention are discussed in the Examples section.

EXAMPLES

Case 1—Linear Interpolation: Chord velocity $V_{Dn}$ lies between two bin average velocities.

Referring back to FIG. 2, a corrologram is shown in which data pairs D1, D2, D3 are located in Bin1, Bin2, Bin3, respectively. The data pairs are defined by velocity values ($V_c$) and proportion values ($Prop_c$). Thus, D1 is defined by ($V_{D1}$, $Prop_{D1}$), D2 is defined by ($V_{D2}$, $Prop_{D2}$), and D3 is defined by ($V_{D3}$, $Prop_{D3}$).

The values in Bin1, Bin2, and Bin3 for all chords have been updated from the initialized values during normal operation of the meter and these bins are considered trained. One, of the other meter chords now fails. The non-failed chord represented by FIG. 2 measures a new velocity ($V_{Dn}$), that falls within the range of Bin1. Thus, $V_{Dn}$ lies between $V_{D1}$ and $V_{D2}$. For the measured velocity $V_{Dn}$, Equation 11 is used to interpolate for proportion $Prop_{Dn}$.

$$Prop_{Dn} = \frac{Prop_{D2} - Prop_{D1}}{V_{D2} - V_{D1}}(V_{Dn} - V_{D1}) + Prop_{D1} \quad (12)$$

Referring still to FIG. 2, $Prop_{Dn}$ thus lies between $Prop_{D1}$ and $Prop_{D2}$. Once $Prop_{Dn}$ has been determined, data pair Dn is defined by ($V_{Dn}$, $Prop_{Dn}$). These values can then be used, in conjunction with values from other non-failed chords, with Equation 11 to determine an average velocity through the meter.

CASE 2—Assigned Value: Chord velocity $V_{Dn}$ does not lie between any two bin average velocities.

Referring back to FIG. 3, a corrologram is shown in which data pairs D1, D2, are located in Bin1, Bin2, respectively. The data pairs are defined by velocity values ($V_c$) and proportion values ($Prop_c$). Thus, D1 is defined by ($V_{D1}$, $Prop_{D1}$) and D2 is defined by ($V_{D2}$, $Prop_{D2}$). These data pairs have been established during normal operation of the meter and the bins are considered trained.

A chord fails and the non-failed chord represented by FIG. 3 measures a new velocity ($V_{Dn}$) that falls into Bin3. $V_{Dn}$ is higher than and lies to the right of both $V_{D1}$ and $V_{D2}$. For the measured velocity $V_{Dn}$, the method would use the proportion value ($Prop_{chord}$) from the bin with the next highest average velocity, which is $V_{D2}$. Still referring to FIG. 3, the method would use the $Prop_{D2}$ value for $Prop_{Dn}$, and use these values, in conjunction with velocity and estimated proportion values from other non-failed chords, with Equation 11 to determine an average velocity through the meter.

The present method is intended for use in an ultrasonic flow meter. In a preferred embodiment, an ultrasonic flow meter suitable to measure the average flow in a pipe includes at least two pairs of ultrasonic transducers capable of transmitting ultrasonic signals along a chord and a processor suitable to calculate the average flow velocity ($V_{wtdavg}$) according to Equation 11. It is contemplated that any number of transducers may be used in the flow meter, however at least one pair of non-failed transducers must be used.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, while the average flow velocity ($V_{wtdavg}$) can be determined using geometry-based values (i.e. $Wt_{chord}$), and average flow velocity can be also be determined using a straight average, Reynold's number correction, or by using weights derived empirically or by other means. Also, parameters which correlate to the average flow velocity can be used. These parameters include, but are not limited to, $\Delta t$, $\Delta t/(t_1 t_2)$, and $\Delta t/c$ (where c is the speed of sound). Furthermore, the estimated average flow velocity may be calculated by other means, as shown in Equation 13:

$$V_{avg} = \frac{\sum_{i=1...n} \frac{V_i}{Prop_i}}{n}; \text{ where} \quad (13)$$

$Prop_i$ = current proportion for a chord $V_i$ = measured velocity for a chord $n$ = number of chords $V_{avg}$ = average flow velocity.

Accordingly, the scope of protection is not limited to the embodiments described herein, but is only limited by the claims which follow, the scope of which shall include all equivalents of the subject matter of the claims.

What is claimed is:

1. A method for determining an estimated velocity of a fluid through a flow meter having at least one failed chord and at least one non-failed chord, the method comprising:
   determining the measured flow velocity from each of the non-failed chords;
   maintaining a plurality of velocity bins, wherein each bin contains a proportion value;
   determining an estimated proportion for each of the measured flow velocities using the proportion values maintained in the plurality of velocity bins; and
   determining the estimated velocity from the measured flow velocities and the estimated proportions.

2. The method of claim 1 wherein the plurality of velocity bins are maintained while there are no failed chords by initializing a plurality of bins with default values, each default value having a proportion value.

3. The method of claim 2 wherein each default value further comprises a velocity value.

4. The method of claim 1, further comprising:
   determining an average flow velocity using a measured velocity from each chord;
   determining a proportion value for each chord by dividing the velocity measured by the chord by the average flow velocity; and
   updating the proportion values in the bins using the measured velocities and determined proportion values, wherein once a proportion value has been updated the bin is considered trained.

5. The method of claim 4 wherein the proportion values are updated as long as there are no failed chords.

6. The method of claim 1 wherein the estimated proportion for each measured flow velocity is considered to be the proportion value for the trained bin which corresponds to the measured flow velocity.

7. The method of claim 1 wherein the estimated proportion for each measured flow velocity is determined by interpolating between two trained bins if the measured flow velocity is between the velocity values of the two bins.

8. The method of claim 1 wherein the estimated proportion for each measured flow velocity is considered to be the proportion value for the trained bin with the highest velocity value if the measured flow velocity is greater than the highest velocity value of the bins.

9. The method of claim 1 wherein the estimated proportion for each measured flow velocity is considered to be the proportion value for the trained bin with the lowest velocity value if the measured flow velocity is less than the lowest velocity value of the bins.

10. The method of claim 1 wherein each chord has ten velocity bins for flow in each of two directions through the meter.

11. The method of claim 1 wherein the estimated velocity is determined by dividing the summation of the measured flow velocities by the summation of the estimated proportions.

12. The method of claim 1 wherein the estimated velocity is determined by summating the measured flow velocity from each of the non-failed chords divided by its corresponding stored proportion value and dividing the summation by the number of non-failed chords.

13. An ultrasonic flow meter suitable for determining the average flow velocity in a pipe, the flow meter comprising:
   at least two pairs of ultrasonic transducers, each pair of transducers capable of transmitting ultrasonic signals along a chord; and
   a processor suitable to maintain a plurality of velocity bins by a method comprising:
      determining an average flow velocity using a measured velocity from each chord;
      determining a proportion value for each chord by dividing the measured velocity by the average flow velocity; and
      updating the proportion values in the bins using the measured velocities ($V_{chord}$) and determined proportion values ($Prop_{chord}$).

14. The flow meter of claim 13 wherein the method further comprises initializing a plurality of bins with default values, each default value having a proportion value.

15. The flow meter of claim 13 wherein once a proportion value has been updated the bin is considered trained.

16. The flow meter of claim 13 wherein at least one chord is failed and at least one chord is non-failed, said processor is adapted to perform a method comprising:
   determining the measured flow velocity from each of the non-failed chords;
   maintaining a plurality of velocity bins, wherein each bin contains a proportion value;
   determining an estimated proportion for each of the measured flow velocities using the proportion values maintained in the plurality of velocity bins; and
   determining the estimated velocity from the measured flow velocities and the estimated proportions.

17. The flow meter of claim 16 wherein the estimated proportion for each measured flow velocity is determined by interpolating between two trained bins if the measured flow velocity is between the velocity values of the two bins.

18. The flow meter of claim 16 wherein the estimated proportion for each measured flow velocity is considered to be the proportion value for the trained bin in which the measured flow velocity is contained.

19. The flow meter of claim 16 wherein the estimated proportion for each measured flow velocity is considered to be the proportion value for the trained bin with the highest velocity value if the measured flow velocity is greater than the highest velocity value of the bins.

20. The flow meter of claim 16 wherein the estimated proportion for each measured flow velocity is considered to be the proportion value for the trained bin with the lowest velocity value if the measured flow velocity is less than the lowest velocity value of the bins.

21. The flow meter of claim 16 wherein each chord has ten velocity bins for flow through the meter in at least one direction.

22. The flow meter of claim 13 wherein at least one chord is failed and at least one chord is non-failed, said processor is adapted to perform a method comprising:
   determining the measured flow velocity $V_{chord}$ from each of the non-failed chords;

determining an estimated proportion $Prop_{chord}$ for each of the measured flow velocities using the values maintained in the plurality of velocity bins; and determining the estimated average velocity by the following equation $$V_{est\,avg} = \frac{\sum\limits_{Non-Failed\ Chords} V_{chord}}{\sum\limits_{Non-Failed\ Chords} Prop_{chord}}.$$

23. The flow meter of claim 13 wherein the average flow velocity is calculated according to the equation:

$$V_{wtd\,avg} = \sum_{Active\ Chords} Wt_{chord} V_{chord},$$

wherein $V_{wtd\,avg}$ is the average flow velocity, $Wt_{chord}$ is a geometry-dependent constant, and there are no failed chords.

24. The flow meter of claim 13 wherein at least one chord is failed and at least one chord is non-failed, said processor is adapted to perform a method comprising:

$$V_{avg} = \frac{\sum\limits_{i=1...n} \frac{V_i}{Prop_i}}{n};$$

wherein $Prop_1$ is the proportion value for a non-failed chord, $V_1$ is the measured velocity for a chord, n is the number of non-failed chords, and $V_{avg}$ is an average flow velocity.

* * * * *